3,819,590
METHOD OF PRODUCING ALTERNATING COPOLYMERS OF CONJUGATED DIENES AND CONJUGATED POLAR ETHYLENICALLY UNSATURATED MONOMERS

Akira Onishi and Koichi Irako, Tokyo, Yutaka Iseda, Uji, Yoshihiro Hayakawa, Tokyo, Takahiro Kawagoe, Tokorozawa, and Shoji Miyamoto, Tokyo, Japan, assignors to Bridgestone Tire Company Limited, Tokyo, Japan
Filed July 28, 1969, Ser. No. 845,338
Claims priority, application Japan, Aug. 2, 1968, 43/54,302; Aug. 8, 1968, 43/55,809; Oct. 18, 1968, 43/75,550
Int. Cl. C08f
Int. Cl. 260—80.7
21 Claims

ABSTRACT OF THE DISCLOSURE

Alternating copolymers of a conjugated diene with a conjugated polar ethylenically unsaturated monomer, wherein the conjugated diene unit and the conjugated polar ethylenically unsaturated monomer unit are bonded substantially alternately, are produced by copolymerizing said conjugated diene with said conjugated polar ethylenically unsaturated monomer by means of a catalyst prepared from a component (A) of a compound of a transition metal of the Group IV or V in the Periodic Table, provided that the chelate compounds are excepted, and a component (B) of a zinc halide or an aluminum compound containing halogen. This copolymerization activity can be improved by adding a component (C) of a radical initiator selected from the group consisting of organic peroxides, azonitrile compounds and trialkylboron-oxygen system to the above described components (A) and (B). Furthermore, the molecular weight of the alternating copolymer can be adjusted by adding a molecular weight regulator selected from the group consisting of mercaptans and carbon polyhalides containing bromine or iodine as an essential component to the polymerization reaction system.

---

The resent invention relates to a method of producing alternating copolymers of conjugated dienes with conjugated polar ethylenically unsaturated monomers and more particularly relates to a method of producing alternating copolymers of conjugated dienes with conjugated polar ethylenically unsaturated monomers, wherein the conjugated diene unit and the conjugated polar ethylenically unsaturated monomer unit are bonded substantially alternately, which comprises copolymerizing at least one monomer selected from conjugated dienes having 4 to 10 carbon atoms with at least one conjugated polar ethylenically unsaturated monomer selected from the group consisting of acrylonitrile, methacrylonitrile and α,β-unsaturated carboxylic acid esters at a temperature of —78° C. to 100° C. in liquid state in the presence of a catalyst prepared from a component (A): at least one transition metal compound selected from compounds of transition metals of the Groups IV and V in the Periodic Table, provided that the chelate compounds are excepted, and a component (B): at least one mtal halide selected from the group consisting of zinc halides having the general formula

and aluminum compounds having the general formulae

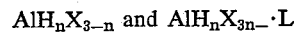

in the above formulae X represents a halogen atom selected from the group consisting of fluorine, chlorine, bromine and iodine atoms, L represents ether having up to 20 carbon atoms and $n$ is a number selected from the group consisting of 0, 0.5, 1.0 and 2.0.

The second aspect of this invention consists in a method of producing alternating copolymers of conjugated dienes with conjugated polar ethylenically unsaturated monomers, in which the polymerization activity is improved by using three component catalysts, wherein at least one radical initiator selected from the group consisting of organic peroxides, azonitrile compounds and trialkylboron-oxygen system as a component (C) is combined to the above described components (A) and (B).

Furthermore, the third aspect of this invention consists in a method for adjusting the molecular weight of the alternating copolymers by adding at least one molecular weight regulator selected from the group consisting of mercaptans, and carbon polyhalides containing bromine or iodine as an essential component to the polymerization reaction system in the above first and second aspects of this invention.

The term "alternating copolymers of conjugated dienes and conjugated polar ethylenically unsaturated monomers" used herein means the copolymers in which the conjugated dienes and the conjugated polar ethylenically unsaturated monomers are bonded substantially alternately.

A method wherein a complex compound is formed from a conjugated polar ethylenically unsaturated monomer, such as, acrylonitrile and a Friedel-Crafts halide, such as zinc chloride, aluminum chloride and the like and the resulting complex compound is copolymerized with a conjugated diene, such as isoprene in the presence of a free radical initiator, has been previously known, for example, in U.S. Pat. No. 3,278,503.

Furthermore, Gaylord et al. have recently reported the same content of investigation. Namely, they reported the copolymerization reaction of isoprene or butadiene with acrylonitrile by using zinc chloride and tert-butyl peroxypivalate (abridged as TBPP hereinafter) as a catalyst. (155th ACS National Meeting (April 1968), Division of Industrial and Engineering Chemistry, 69.)

Gaylord et al. have reported that when zinc chloride alone is used as a catalyst in a copolymerization reaction of isoprene and acrylonitrile, the copolymer wherein the composition of both the monomer units is 1:1, cannot be obtained, but if a free radical initiator, such as, TBPP is used together with zinc chloride, the alternating copolymer having a monomer composition of 1:1 can be obtained.

Also in the inventors' experiments, when a conjugated diene and a conjugated polar ethylenically unsaturated monomer are copolymerized by using zinc chloride alone as a catalyst, it is impossible to obtain the copolymer having a high alternating property as in the case of Gaylord et al.

According to the first aspect of this invention the copolymers having an excellent alternating property can be obtained by combining a compound of a transition metal of the Group IV or V in the Periodic Table to a zinc halide or an aluminum halide, which has never produced copolymers having an excellent alternating property.

This fact is apparent from the description relating to a combination of aluminum chloride and vanadyl trichloride, for example, in a following Example 11.

The characteristic of the present invention consists in the fact that excellent alternating copolymers can be obtained by combining a compound of a transition metal of the Group IV or V to a zinc halide or an aluminum halide as the catalyst. Namely, the transition metal compounds contribute to an improvement of copolymerization of producing the alternating copolymers.

Furthermore, according to the method of the first aspect of this invention the transition metal compounds present in the polymerization system promote the polymerization activity at a low temperature. For example, as shown in comparative example 3, when butadiene and acrylonitrile are copolymerized at a temperature as low as 0° C. by using zinc chloride alone as the catalyst, the polymerization does not substantially proceed. On the contrary, when vanadyl trichloride as the transition metal compound is added to the above described polymerization system as shown, for example, in example 2, the polymerization proceeds in a sufficient activity.

As mentioned above, the first aspect of this invention provides a novel process, wherein the copolymerization reaction can be carried out at a low temperature by means of the two components, each of which has substantially no polymerization reaction ability at a low temperature.

If according to the above described known method, for example, butadiene and acrylonitrile are copolymerized by means of zinc chloride and benzoyl peroxide as the catalyst, the resulting copolymer is substantially gel and is not a rubbery elastomer suitable for practical use and the butadiene unit has block bond and the alternating structure is irregular. According to the first aspect of this invention it is possible to obtain excellent alternating copolymers containing substantially no gel.

According to the second aspect of this invention, it is possible to obtain tough rubbery elastomers containing substantially no gel within a broad monomer feed ratio by adding a compound of a transition metal of the Group IV or V of the Periodic Table to the above described zinc chloridebenzoyl peroxide catalyst system and further the configuration of the copolymers has an excellent alternating property as in the case of the copolymers obtained in the first aspect of this invention and the polymerization activity in the first aspect of this invention can be further improved.

Thus the second aspect of this invention can provide alternating copolymers having excellent physical properties and containing substantially no gel as in the case of the first aspect and can improve further the polymerization activity by using three component catalysts, wherein at least one radical initiator component (C) of organic peroxides, azonitrile compounds and trialkylboron-oxygen system is combined to the two catalytic components (A) and (B) in the first aspect of this invention.

Furthermore, the characteristics of this invention consists in a method of producing alternating copolymers, wherein conjugated diene unit is bonded in a high trans-1,4 type. For example, in butadiene-acrylonitrile alternating copolymers, the trans-1,4 bond is more than about 95% and consequently, the present invention provides a method of producing alternating copolymers having a high trans-1,4 bond.

The conjugated dienes to be used in the present invention are ones having 4 to 10 carbon atoms and the typical examples are butadiene-1,3, isoprene, pentadiene-1,3, hexadiene-1,3, 2,3-dimethyl-butadiene-1,3, and phenyl-butadiene-1,3. Among them, butadiene-1,3 and isoprene are preferable. Furthermore, B-F fraction containing butadiene-1,3 and isobutylene obtained by naphtha cracking process may be used.

The conjugated polar ethyleneically unsaturated monomers to be used in the present invention include acrylonitrile, methacrylonitrile, and $\alpha,\beta$-unsaturated carboxylic acid esters, for example, methyl acrylate, ethyl acrylate, propyl acrylate, butyl acrylate, methyl methacrylate, ethyl methacrylate, and the like. Among them, methyl acrylate, methyl methacrylate and acrylonitrile are preferable.

As combinations of monomers, mention may be made of butadiene/acrylonitrile, butadiene/methyl methacrylate, butadiene/methyl acrylate, butadiene/methacrylonitrile, isoprene/acrylonitrile, isoprene/methyl methacrylate, isoprene/methyl acrylate, butadiene/ethyl acrylate, pentadiene-1,3/acrylonitrile, pentadiene-1,3/methyl acrylate, etc. Furthermore, combinations of at least three monomers, such as, butadiene/acrylonitrile/butyl acrylate, butadiene/acrylonitrile/methyl methacrylate, butadiene/isoprene/acrylonitrile, etc., may be used. Any above-mentioned combinations can produce alternating copolymers composed of a conjugated diene and a conjugated polar ethylenically unsaturated monomer in a molar ratio of 1:1.

The proportion of the conjugated diene to the conjugated polar ethylenically unsaturated monomer to be used for the copolymerization reaction may be selected optionally, but it is usually within a range of 1/10–10/1 (molar ratio). The monomer feed ratio influences the yield, the degree of polymerization of the resulting copolymer and the like, so that the monomer feed ratio can be properly determined depending upon the purpose.

Means for feeding the monomers is optional.

The catalytic component (A) to be used in the method of the present invention is at least one compound selected from the group consisting of compounds of the transition metals of Groups IV and V in the Periodic Table. Among them, compounds soluble in the mixed monomer solution are suitable, and particularly compounds of Group V soluble in the mixed monomer solution are more preferable.

The most preferable one is vanadium compound soluble in the mixed monomer solution.

The compounds of the transition metals of the Groups IV and V in the Periodic Table to be used as the catalytic component (A) are not limited in the bonding form, provided that the chelate compounds are excepted, and include halides, alcoholates, cyclopentadienyl compounds, amide compounds, etc. For example, mention may be made of vanadium tetrachloride, vanadyl trichloride, vanadyl dichloride, dicyclopentadienyl vanadium dichloride, triethyl orthovanadate, di-n-butyl monochloro-orthovanadate, ethyl dichloro-orthovanadate, n-butyl dichloro-orthovanadate, n-hexyl dichloro-orthovanadate, cyclohexyl dichloro-orthovanadate, tris(p-chlorophenyl)orthovanadate, vanadium tetrabromide, vanadium tetraiodide, vanadyl tribromide, vanadyl triiodide, dimethyl monobromo-orthovanadate, tert-butyl dichloro-orthovanadate, di-tert-butyl monochloro-orthovanadate, tri-tert-butyl orthovanadate, trimethyl orthovanadate, tripropyl orthovanadate, triisopropyl orthovanadate, tributyl orthovanadate, triisobutyl orthovanadate, tri-sec-butyl orthovanadate, tripentyl orthovanadate, triisopentyl orthovanadate, trihexyl orthovanadate, tri-2-ethylhexyl orthovanadate, tritolyl orthovanadate, triphenyl orthovanadate, tricyclohexyl orthovanadate, vanadyl naphthenate, vanadyl acetate, vanadyl octenate, vanadyl isooctenate, vanadyl oxalate, vanadium trichloride, tantalum pentachloride, pentaethoxy tantalum, penta-methoxy tantalum, penta-propoxy tantalum, penta-isopropoxy tantalum, penta-isobutoxy tantalum, penta-sec butoxy tantalum, penta-n-butoxy tantalum, triethoxy tantalum dichloride, tributoxy tantalum dichloride, tetra-n-butoxy zirconium, zirconium tetrachloride, titanium tetrachloride, titanium trichloride, butoxy titanium trichloride, dibutyoxy titanium dichloride, tributoxy titanium chloride, tetra-methoxy titanium, tetra-ethoxy titanium, tetra-propoxy titanium, tetra-isopropoxy titanium, tetra-butoxy titanium, tetra-isobutoxy titanium, tetra-sec-butoxy titanium, tetra-tert-butoxy titanium, tetra-pentoxy titanium, tetra-phenoxy titanium, titanium acetate, titanium oxalate, titanium tetra(dimethylamide), titanium tetra(diethylamide), titanium tetra(dibutylamide), titanium trichloride-aluminum chloride adduct, zirconium tetra(dimethylamide), zirconium tetra(diethylamide), zirconium tetra(dibutylamide), vanadium tetra (dimethylamide), vanadium tetra(diethylamide), tantalum tri(di-n-propylamino) monoethylimide, tanalum tri(diethylamino) monoethylimide, penta-tert-butoxy niobium, penta-isopropoxy niobium, niobium tetra(diethylamide), niobium tetra(di-n-propylamide), niobium pentachloride, penta-methoxy niobium, penta-ethoxy niobium and the like, and combinations thereof.

Among them, compounds soluble in the mixed monomer solution, particularly, vanadium compounds are preferable. The preferable compounds include vanadyl trichloride, tri-tert-butyl orthovanadate, triethyl orthovanadate, di-tert-butyl monochloro-orthovanadate, tert-butyl dichloro-orthovanadate, vanadium tetrachloride, tetra-n-butoxy titanium, tetra-isopropoxy titanium, di-n-butoxy titanium dichloride, tetra-ethoxy tantalum, tetra-n-butoxy zirconium, vanadyl acetate, vanadyl naphthenate, vanadyl oxalate, vanadyl octenate, vanadyl isooctente, titanium tetrachloride, titanium acetate, and titanium oxalate and combinations thereof.

The catalytic component (B) to be used in the present invention is at least one metal halide selected from the group consisting of zinc halides and aluminum compounds having the following general formulae:

$$ZnX_2, AlH_nX_{3-n} \text{ and } AlH_nX_{3-n} \cdot L$$

wherein X represents a halogen atom selected from the group consisting of fluorine, chlorine, bromine and iodine atoms, L represents ether and $n$ is a member selected from the group consisting of 0, 0.5, 1.0 and 2.0.

The zinc halide represented by the formula $ZnX_2$, wherein X represents a halogen atom selected from the group consisting of fluorine, chlorine, bromine and iodine atoms, includes zinc fluoride, zinc chloride, zinc bromide and zinc iodide. Among them, zinc chloride and zinc bromide are preferable.

The aluminum halide and aluminum hydride halide represented by the general formula $$AlH_nX_{3-n}$$

and the ether complex of these aluminum compounds having the general formula $$AlH_nX_{3-n} \cdot L$$

wherein X represents a halogen atom, $n$ is 0, 0.5, 1.0 or 2.0 and L represents ether having up to 20 carbon atoms, include aluminum halides, such as aluminum fluoride, aluminum chloride, aluminum bromide and aluminum iodide; ether complexes of these aluminum halides represented by the formulae $AlF_3 \cdot (C_2H_5OC_2H_5)$, $$AlCl_3 \cdot (C_2H_5OC_2H_5)$$

$AlBr_3 \cdot (C_2H_5OC_2H_5)$, and $AlI_3 \cdot (C_2H_5OC_2H_5)$; ether complexes of aluminum hydride chloride represented by the formulae $AlH_{0.5}Cl_{2.5} \cdot (C_2H_5OC_2H_5)$, $$AlHCl_2 \cdot (C_2H_5OC_2H_5)$$

etc.; aluminum hydride iodides represented by the formulae $AlH_{0.5}I_{2.5}$, $AlHI_2$, $AlH_2I$, etc.; aluminum hydride bromides represented by the formulae $AlH_{4.5}Br_{2.5}$, $AlHBr_2$, $AlH_2Br$, etc.; and aluminum hydride fluorides represented by the formulae $AlH_{0.5}F_{2.5}$, $AlHF_2$, $AlH_2F$, etc., and the like. Preferable catalyst component (B) are aluminum chloride, aluminum bromide, $$AlCl_3 \cdot (C_2H_5OC_2H_5)$$

$AlH_{0.5}Cl_{2.5} \cdot (C_2H_5OC_2H_5)$, $AlHCl_2 \cdot (C_2H_5OC_2H_5)$, $$AlH_{0.5}I_{2.5}$$

$AlHI_2$, $AlH_{0.5}Br_{2.5}$, $AlHBr_2$, $AlH_{0.5}F_{2.5}$, $AlHF_2$, etc. Among them, aluminum chloride, aluminum bromide, $AlCl_3 \cdot (C_2H_5OC_2H_5)$, $AlH_{0.5}Cl_{2.5} \cdot (C_2H_5OC_2H_5)$, and $$AlHCl_2 \cdot (C_2H_5OC_2H_5)$$

are most preferable.

The components (A) and (B) according to the invention may involve complexes obtained by complexing the components (A) and/or (B) with a suitable basic organic compound. The suitable basic organic compounds include organonitriles, such as acetonitrile, propionitrile, valeronitrile, fumaronitrile, acrylonitrile, methacrylonitrile, benzonitrile, etc.; organic carboxylic acid esters, such as ethyl acetate, ethyl propionate, ethyl butyrate, methyl acetate, methyl propionate, methyl butyrate, propyl acetate, methyl acrylate, ethyl acrylate, propyl acrylate, methyl methacrylate, ethyl methacrylate, propyl methacrylate, butyl methacrylate, methyl crotonate, ethyl crotonate, methyl benzoate, ethyl benzoate, methyl phthalate, ethyl terephthalate, ethyl isophthalate, butyl benzoate, methyl salicylate, ethyl salicylate, etc.; organic aldehydes, such as formaldehyde, acetoaldehyde, propionaldehyde, acrolein, benzaldehyde, etc.; organic acids, such as acetic acid, propionic acid, benzoic acid, salicyclic acid, etc.; organic ethers, such as ethyl ether, methyl ether, propyl ether, tetrahydrofuran, anisole, veratrol, ethylene glycol dimethyl ether, etc.; thioethers, such as ethyl thioether, methyl ethyl thioether, ethyl propyl thioether, propyl butyl thioether, thiophene, etc.; amines, such as, diphenylamine, phenyl-$\beta$-naphthylamine, trimethylamine, aniline, triphenylamine, dimethylaniline, methylamine, dimethylamine, indole, carbazole, etc.; pyridine and pyridine derivatives, such as picolines, $\beta$-collidine, quinoline, 2,4,6-collidine, etc.; phosphines, such as triphenylphosphine, trimethylphosphine, triethylphosphine, triisopropylphosphine, etc.; phosphites, such as triphenyl phosphite, dimethyl phosphite, diethyl phosphite, diisopropyl phosphite, diallyl phosphite, etc.; phosphates, such as trimethyl phosphate, triethyl phosphate, dilauryl phosphate, tris (butoxyethyl) phosphate, bis(2 - ethylhexyl)phosphate, etc.; phosphonates, such as diisopropyl dimethylaminomethylphosphonate, etc.; arsines, such as triphenylarsine, trimethylarsine, triethylarsine, triisopropylarsine, etc.; hexamethylphosphortriamide; carbon disulfide; polycyclic aromatic hydrocarbons, such as naphthalene, anthracene, phenanthrene, fluorene, etc.; and the like. Among them, acrylonitrile, methyl methacrylate, dimethylaniline, naphthalene, phenanthrene, fluorene and the like are most preferable.

The catalysts according to the invention consist of the components (A) and (B) and are usually prepared at a temperature of from $-100°$ C. to $100°$ C. For the order of preparing the catalysts, there are various manners. For example, the following orders for the preparation can be used, but the order is not limited thereto.

(1) To a mixture of the catalytic components (A) and (B) are added a conjugated polar ethylenically unsaturated monomer and a conjugated diene in this order or in a reverse order.

(2) To the component (A) are added a conjugated polar ethylenically unsaturated monomer and a conjugated diene in this order or a reverse order. The resulting mixture is aged at $-78°$ C. to $+60°$ C. within such an extent that polymerization does not occur, and finally the component (B) is added to the aged system.

(3) The component (B) and a conjugated polar ethylenically unsaturated monomer are mixed and the resulting mixture is aged at $-78°$ C. to $+60°$ C. within such a extent that polymerization does not occur. Then to the aged system are added a conjugated diene and the component (A) in this order or in a reverse order.

(4) The component (A) and the component (B) are mixed in the presence of a conjugated diene and a conjugated polar ethylenically unsaturated monomer.

When the component (A) or (B) is a combination of two or more compounds respectively, such a combination may be used either by previously mixing and aging these compounds or by adding them separately.

The proportion of transition metal in the component (A) per 1 g.-atom of metal in the component (B) is within the range of $\frac{1}{10^6}$– 2 g.-atom, preferably $\frac{1}{10^5}$–1 g.-atom, more particularly $\frac{1}{200}$–$\frac{1}{2}$ g.-atom.

A total amount of both the components (A) and (B) to be used can be selected optionally, but a total amount of metal atoms in both components (A) and (B) per 1 mole of the total fed monomer is usually within the range of $\frac{1}{10^5}$–1 g.-atom, preferably $\frac{1}{10^3}$–$\frac{1}{2}$ g.-atom, more particularly $\frac{1}{10^2}$–$\frac{1}{2}$ g.-atom.

The catalyst system of this invention consists of the above described two components (A) and (B) and they are essential components for carrying out this invention, but it is possible to improve the polymerization activity by adding a radical initiator to this system. The radical initiator is organic peroxides, azonitrile compounds or trialkylboron-oxygen system.

The composition, microstructure, arrangement of monomer units of the resulting copolymers and the like can be confirmed by solubility, nuclear magnetic resonance (NMR) spectrum, infrared (IR) spectrum, elementary analysis, composition analysis of the copolymers obtained by varying monomer feed ratio, stress-strain curve, pyrolysis gas chromatography of the resulting copolymers and the like. Also, when a radical initiator is added to the two components (A) and (B) of this invention, it is possible to obtain the copolymers having substantially the same composition, microstructure and arrangement of monomer units as those in the case of the two component system.

The radical initiator of organic peroxide to be used in this invention includes diacyl peroxides, such as benzoyl peroxide, lauroyl peroxide, caprylyl peroxide, myristoyl peroxide, stearoyl peroxide, 2,4-dichlorobenzoyl peroxide, 4-nitrobenzoyl peroxide, 4-methoxybenzoyl peroxide, 4-chlorobenzoyl peroxide, phthaloyl peroxide, acetyl peroxide, bis-O-carboethoxybenzoyl peroxide, 2-methylpentanoyl peroxide, etc.; ketone peroxides, such as methyl ethyl ketone peroxide, and cyclohexanone peroxide, etc.; hydroperoxides, such as tert-butyl hydroperoxide, paramenthane hydroperoxide, diisopropylbenzene hydroperoxide, and cumene hydroperoxide, etc.; dialkyl peroxides, such as di-tert-butyl peroxide, tert-butylcumylperoxide, and dicumyl peroxide, etc.; peracid esters, such as tert-butyl peroxybenzoate, bis($\alpha,\alpha$-dimethylbenzyl)dimethyl peroxymalonate, tert-butylperoxyisobutylate, tert-butylperoxyacetate, tert-butylperoxypivalate, 2,5-dimethylethylhexyl-2,5-di(peroxybenzoate), and phenyl peroxycarbamate, etc.; dialkyl percarbonates, such as diisopropyl percarbonate, di-n-butyl peroxypercarbonate, and tert-butyl peroxyisopropylcarbonate, etc. Among them, diacyl peroxides, such as benzoyl peroxide; peracid esters, such as tert-butyl peroxypivalate and dialkyl percarbonates, such as diisopropyl percarbonate are particularly preferable.

The azonitrile compounds have the general formula

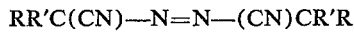

RR'C(CN)—N=N—(CN)CR'R wherein R and R' are organic radicals having 1 to 10 carbon atoms and as these azonitrile compounds mention may be made of the compounds wherein R is methyl group and R' is methyl, ethyl, n-propyl, isopropyl, cyclopropyl, n-butyl, isobutyl, n-amyl, cyclohexyl, 2,2-dimethyl-n-propyl, benzyl, p-chlorobenzyl, p-nitrobenzyl, cyclobutyl, cyclopentyl, cycloheptyl, cyclooctyl or cyclodecyl group, the compounds wherein R is isopropyl group and R' is ethyl or isopropyl group and the compounds wherein R is isobutyl group and R' is isobutyl group. Among them, azobisisobutylonitrile and azobis-2,4-dimethylvaleronitrile are particularly preferable.

Concerning trialkylboron-oxygen system, trialkylboron includes, for example, trimethylboron, triethylboron, tri-n-propylboron, triisopropylboron, tri-n-butylboron, tri-isobutylboron, tri-sec-butylboron and the like. The proportion of these boron compounds and oxygen is optional. Among them, tri-n-ethylboron and tri-nbutylboron are particularly preferable.

An amount of the radical initiator to be added for activating the polymerization reaction is sufficient in an amount of about 0.005 to 5 mole percent based on the total amount of the monomers. Of course an amount beyond this range may be used.

The process for feeding the radical initiator is not particularly limited, but of course it should be avoided to feed the initiator under such a condition that the polymerization starts before the total monomers and all other catalytic components are not still charged, for example, at an extremely higher temperature than the decomposition temperature of the radical initiator.

The inventors have succeeded in synthesis of the alternating copolymers by using each of the above described catalyst systems and further the following facts have been found in the course of investigation for industrial production. Namely, (1) The physical property and processability of the alternating copolymers are influenced considerably by the degree of polymerization, and (2) The degree of polymerization of the alternating copolymers depends mainly upon the amount of catalyst used and the yield of polymerization.

In the above item (2) when the amount of catalyst used decreases, the degree of polymerization increases and when the yield of polymerization increases, the degree of polymerization increases. The amount of catalyst used is naturally preferable to be smaller in view of the economic point and an amount of catalyst remained in the resulting copolymers, but it has been found that if the amount of catalyst to be used decreases, the degree of polymerization increases excessively and the viscosity of the polymerization reaction system extremely increases and the agitation and the removal of reaction heat become difficult and consequently the control of reaction velocity is difficult and therefore a side reaction, for example, gelation may occur. Furthermore, since the degree of polymerization varies according to the yield of polymerization, it is very difficult to obtain the copolymers having the degree of polymerization of the most preferable range in view of the physical properties and processability in a high reproduceability. Accordingly, a method, by which the degree of polymerization of the copolymers can be controlled, even if the amount of the catalyst used is small, has been demanded.

The inventors have found that when at least one compound selected from the group consisting of mercaptan compounds (I) and carbon polyhalides (II) containing bromine or iodine as an essential component is added as a molecular weight regulator to the polymerization system in the presence of the above described catalysts for alternating copolymers, the copolymers having a lower molecular weight than the case when the polymerization is effected by using only the catalyst system for the alternating copolymers can be obtained without substantially disturbing the alternating property of the resulting copolymers.

A large number of molecular weight regulators have heretofore been disclosed in radical polymerization, ionic polymerization, coordinate polymerization, and the like but any molecular weight regulator for the alternating copolymerization reaction has never been known. The reaction mechanism itself has never been confirmed and therefore it cannot be conceived that the well-known chain transfer agents are effective directly. For example, carbon polychlorides, such as carbon tetrachloride and chloroform, which have been usually used a a molecular weight regulator for radical polymerization among carbon polyhalides, have no effect. Moreover, for example, cumene and ethylbenzene which have a very large chain transfer constant of radical polymerization of acrylonitrile and the like, have substantially no effect. Accordingly, the molecular weight in the alternating polymerization cannot be discussed with respect to the regulating mechanism similarly to the chain transfer agent in the radical polymerization.

The molecular weight regulator to be used in this invention will be mentioned.

(1) As mercaptan compounds, general compound having mercapto group may be used, for example, methanethiol, ethanethiol, 1-propanethiol, 2-propanethiol, 1-butanethiol, 2-butanethiol, 2-methyl-1-propanethiol, 2-methyl-2-propanethiol, 1-pentanethiol, 2-pentanethiol, 3-pentanethiol, 2-methyl-2-butanethiol, isopentanethiol, 1-hexanethiol, tert-hexylmercaptan, 1-heptanethiol, tert-hepthylmercaptan, 1-octanethiol, tert-octanethiol, tert-nonylmercaptan, 1 - decanethiol, 1 - dodecanthiol, tert-dodecanethiol, 1-tetradecanethiol, tert-tetradecanethiol, n-hexadecanethiol, tert-hexadecanethiol, n-octadecanethiol, ethanedithiol, 1,6-hexanedithiol, dodecanedithiol, 3-ethoxypropanethiol, 2-ethoxypropanethiol, allylmercaptan, thioacetic acid, thiobenzoic acid, thiophenol, ethylthioglycolate, benzylmercaptan, p-ethoxythiophenol, α-toluenethiol, m-toluenethiol, o-toluenethiol, p-toluenethiol, thioxylenol, β-naphthalenethiol, p-tert-butylthiophenol, dodecylbenzylmercaptan, toluene-3,4-dithiol, 2-mercaptobenzothiazole, etc., and mixtures thereof.

Furthermore, mercaptan compounds having amino group, hydroxyl group, chloro group or carboxyl group together with mercapto group, such as 4-aminothiophenol, 4 - mercaptobenzylchloride, 4-mercaptophenol, 4-mercaptobenzoic acid, p-chloromethylthiophenol, 3-mercaptopropanol, aminoalkylmercaptan, etc., and mixtures thereof may be used.

(2) As carbon polyhalides containing bromine or iodine as an essential component, carbon tetrabromide, trichloromonobromomethane, bromoform, iodoform, carbon tetraiodide and the like and mixtures thereof may be used.

The process for adding these molecular weight regulators is not particularly defined. A amount of these molecular weight regulators used varies within a broad range depending upon the monomers to be copolymerized, catalyst system to be used, polymerization temperature and other conditions and the molecular weight regulators to be used. In general, the amount of the regulator is $5 \times 10^{-2}$ to $10^{-8}$ mole per mole of the total monomers, preferably $10^{-2}$ to $10^{-6}$ mole. The amount beyond this range may be naturally used according to the object. Generally, the larger the amount of the regulator, the lower the molecular weight of the resulting copolymer is. A liquid polymer can be obtained depending upon the amount of the regulator used.

The composition, microstructure, arrangement of monomer units of the resulting copolymers and the like can be confirmed by solubility, NMR spectrum, IR spectrum, elementary analysis, composition analysis of the copolymer obtained by varying monomer feed ratio, stress-strain curve, pyrolysis gas chromatography of the copolymers and the like and when the molecular weight regulator is used together with the catalyst system for the alternating copolymerization, it is possible to obtain the copolymer having substantially the same composition, microstructure and arrangement of monomer units as those of the copolymer obtained by the copolymerization reaction by means of the catalyst system for the alternating copolymerization alone and having a molecular weight smaller than the copolymer.

The copolymerization reaction can substantially be carried out by a bulk polymerization without the use of a solvent, and further carried out in a solvent which does not prevent the copolymerization reaction.

As such solvents, mention may be made of aromatic hydrocarbons, alipahtic hydrocarbons, alicyclic hydrocarbons, halogenated hydrocarbons, and carbon disulfide, for example, carbon tetrachloride, pentane, butane, propane, hexane, heptane, octane, ligroin, petroleum ether and other petroleum mixed solvent, liquid paraffin, chlorinated paraffin, cyclohexane, benzene, toluene, xylene, dichloromethane, dichloroethane, trichloroethane, tetrachloroethylene, butyl chloride, chloroform, chlorobenzene, dichlorobenzene and carbon disulfide and their mixtures.

A ratio of the solvent to be used based on the monomer can be selected optionally.

The polymerization temperature is within the range of $-78°$ C. to $+100°$ C., preferably to $+80°$ C.

The copolymerization reaction is carried out under a pressure from one determined by vapor pressure in the reaction system to 50 atm.

The copolymerization reaction is preferably carried out under an inert atmosphere, for example, nitrogen gas.

After the completion of the polymerization reaction, the after-treatment is carried out by conventional methods to purify and recover the copolymer. These methods include alcohol precipitation, alcohol washing, alcohol-hydrochloric acid washing, hydrochloric acid-water washing and the like. Furthermore, an after-treatment for the polymer obtained by a catalyst containing Lewis acid may be used. In addition, a process for separating and recovering the catalytic components by adding a compound capable of forming a complex with the catalytic component may be used.

The copolymers obtained by the method according to the present invention have various properties according to the combination of monomers, the kind, composition and amount of the catalyst, the monomer feed ratio and the other polymerization condition. However, the structure of the alternating copolymers does not vary.

The composition, microstructure and arrangement of both monomer units in the obtained copolymers are confirmed by solubility, NMR spectrum, IR spectrum, elementary analysis, composition analysis of the copolymers obtained by varying the monomer feed ratio, stress-strain curve of the resulting copolymers, pyrolysis gas chromatography and the like. With respect to these points, an explanation will be made by exemplifying butadiene/acrylonitrile copolymer.

For a better understanding of the invention, reference is taken to the accompanying drawings, wherein.

Figure 1:
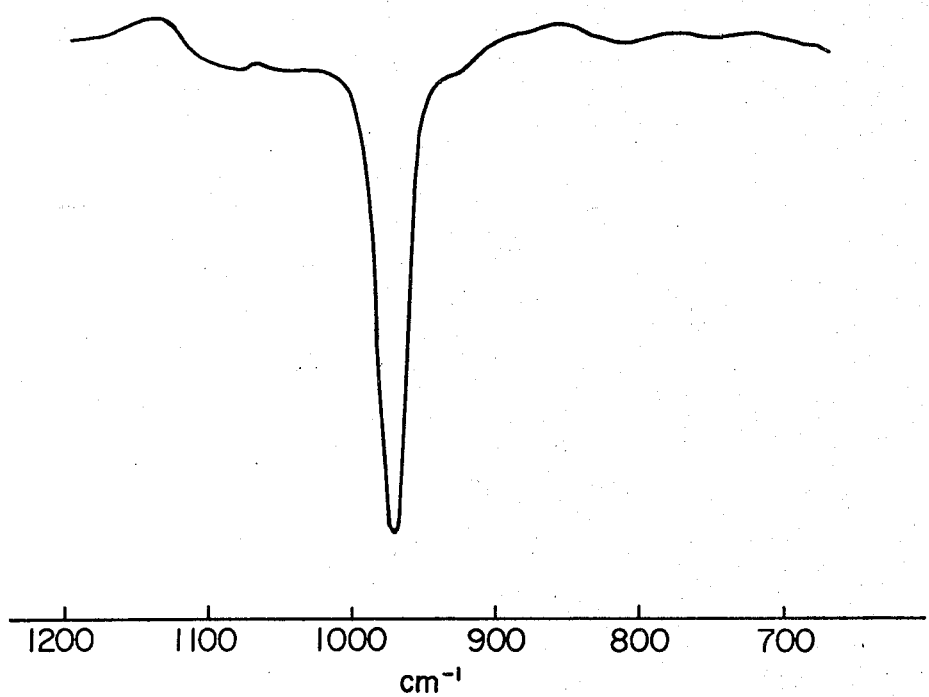
FIG. 1 is an infrared absorption spectrum diagram of butadiene/acrylonitrile copolymer in the following Example 1.
Figure 2:
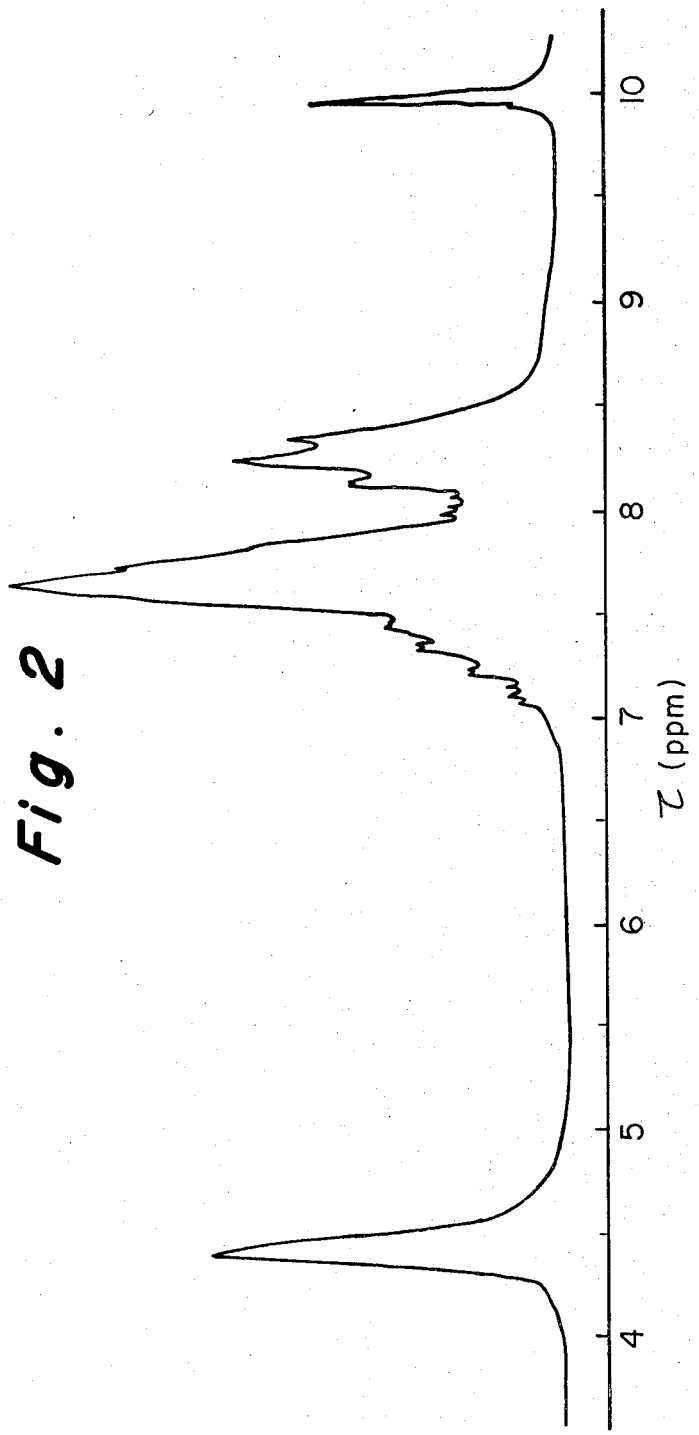
FIG. 2 is a nuclear magnetic resonance spectrum diagram of the same copolymer as in FIG. 1.
Figure 3:
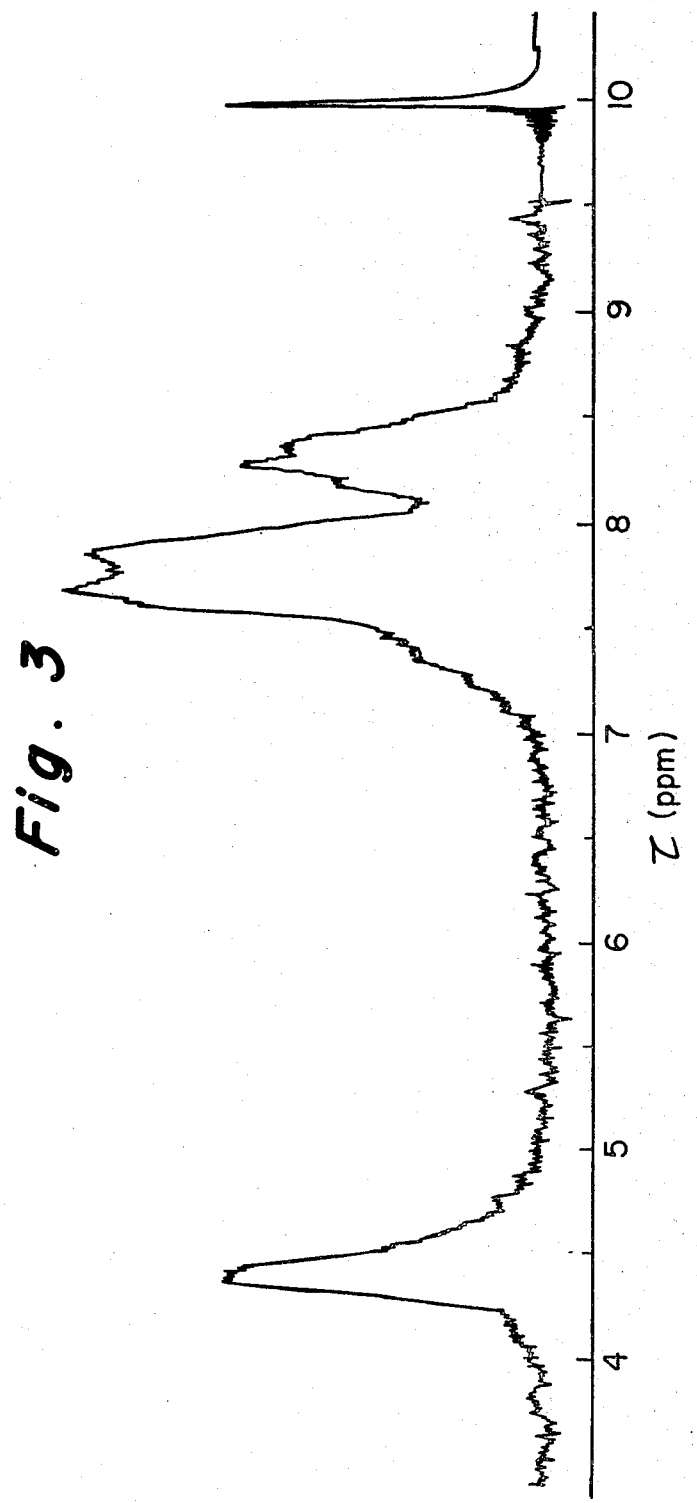
FIG. 3 is a nuclear magnetic resonance spectrum diagram of butadiene/acrylonitrile copolymer in the following comparative Example 1.
Figure 4:
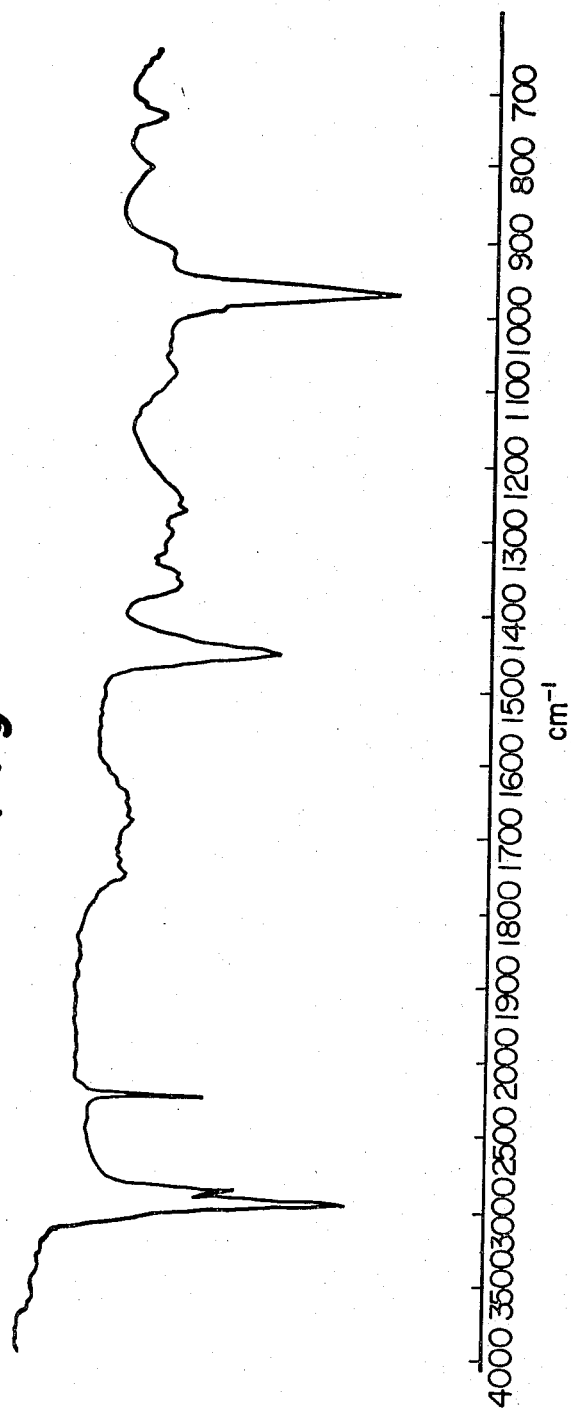
FIG. 4 is an infrared absorption spectrum diagram of butadiene/acrylonitrile copolymer in the following Example 11.
Figure 5:
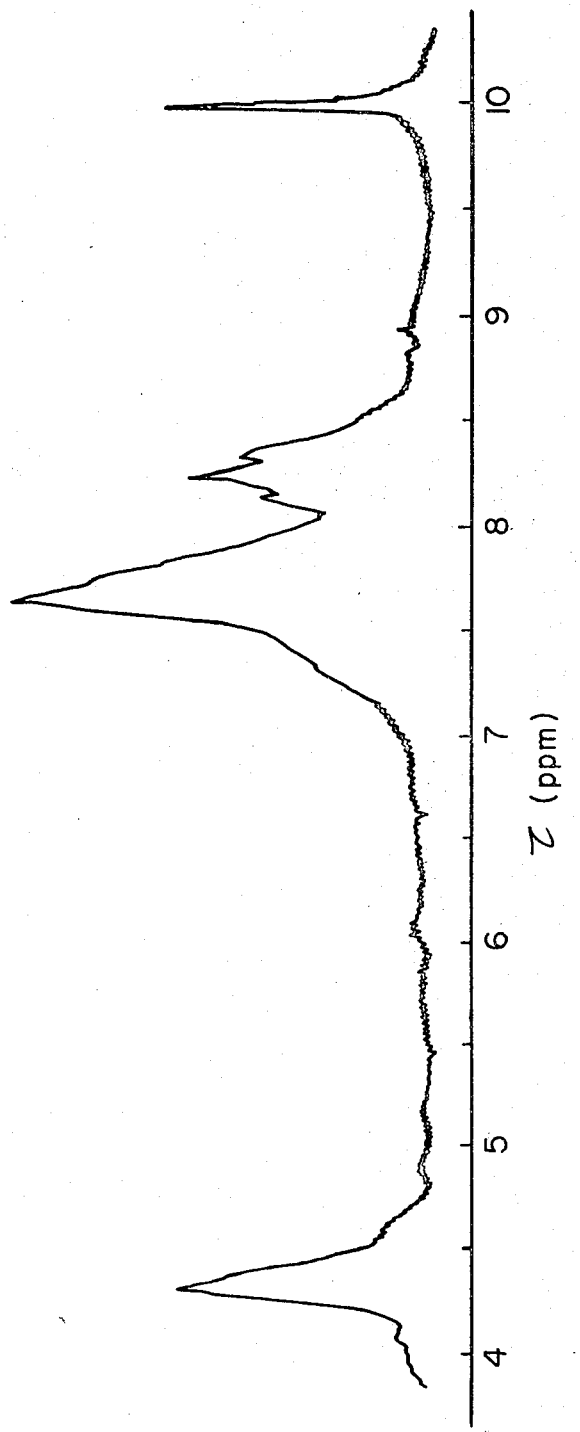
FIG. 5 is a nuclear magnetic resonance spectrum diagram of the same copolymer as in FIG. 4.

(a) Solubility: The acrylonitrile/butadiene copolymer obtained by the present invention is soluble in dimethylformamide, tetrahydrofuran, acetonitrile, benzonitrile, acrylonitrile, methyl ethyl ketone, chloroform, nitromethane, dioxane, acetone, dimethyl sulfoxide, aniline, nitropropane, nitrobenzene, ethyl acetate, trichloroethane and the like but insoluble in hexane, heptane, benzene and toluene.

This shows that said copolymer is considerably different from polyacrylonitrile insoluble in acetonitrile, tetrahydrofuran, chloroform, dioxane and acetone and polybutadiene insoluble in dioxane, acetone, acetonitrile and soluble in toluene. Furthermore, it can be seen that the copolymer does not contain a homopolymer of each component and has a structure, which is considerably different from that of each homopolymer.

(b) IR spectrum: The butadiene/acrylonitrile copolymer obtained by the present invention was dissolved in tetrahydrofuran, and the resulting solution was formed into a copolymer film on a rock salt plate and then IR spectrum of the copolymer film was measured. The characteristic absorption band of nitrile group in acrylonitrile unit and the characteristic absorption band of trans-1,4 bond in butadiene unit were distinctly observed at 2,240 cm.$^{-1}$ and 970 cm.$^{-1}$ respectively, but the characteristic absorption bands of (—C=N—) bond in acrylonitrile unit and cis-1,4 bond in butadiene unit were not observed, and 1,2-bond in butadiene unit was very small. Besides, when the microstructure of butadiene unit in the copolymer was analyzed by means of a method described in Chim. e. Ind., 41, 758 (1959) by Morero et al., trans-1,4 bond was 97%, 1,2-bond 3% and cis-1,4 bond ~ 0%. The copolymers produced by the different polymerization conditions gave always the same IR spectrum.

The method of the present invention always provided butadiene/acrylonitrile copolymer connected butadiene in trans-1,4 type of more than 95%.

The composition ratio of both the monomer units in the copolymer can also be analyzed from IR spectrum. For example, when as the characteristic absorption bands acrylonitrile unit and butadiene unit are selected 2,240 cm.$^{-1}$ and 970 cm.$^{-1}$ respectively and the ratio of absorbance of these absortion bands is measured, if the composition of the copolymer is constant, the ratio of the absorbance is constant, so that said ratio indicates the composition of the copolymer. By this method, it was found that the copolymers obtained by the present invention have always the same composition. Moreover, it was confirmed from elementary analysis and NMR spectrum that the composition mole ratio of both the monomer units is substantially 1:1.

(c) NMR spectrum: Various acrylonitrile/butadiene copolymers obtained by the present method were dissolved in deuterochloroform and measured at 60 mc./sec. or 100 mc./sec. with respect to NMR spectrum to always obtain the same spectrum. In each NMR spectrum, the chemical shift of each proton assigned to butadiene unit and acrylonitrile unit was observed. Furthermore, it was found that said chemical shift is entirely different from the chemical shifts of polybutadiene, polyacrylonitrile and block bond of butadiene unit. In the chemical shift of the butadiene/acrylonitrile copolymer obtained by the present invention, the chemical shift assigned to butadiene unit was observed in $\tau=4.43$ and 7.70 and the chemical shift assigned to acrylonitrile unit was observed in $\tau=$about 7.35 and 8.27 and the other chemical shifts were not observed. While, the copolymer produced by emulsion polymerization using a conventional free radical initiator was measured with respect to NMR spectrum. The NRM spectra of the copolymer of the invention and the copolymer produced by the emulsion polymerization were compared. In the NMR spectrum of the copolymer obtained by the emulsion polymerization, the chemical shifts owing to block bond were observed in addition to the chemical shifts observed in the copolymer of the invention. For example, the methine proton in butadiene unit was observed as a shoulder at $\tau=$about 4.6 and the methylene proton in butadiene unit was observed as an additional peak at $\tau=7.87$. These additional peaks were increased in random copolymer containing 60 mol percent of butadiene unit, and the peak in $\tau=7.87$ was larger than the peak in $\tau=7.70$. From this it was found that the chemical shifts in $\tau=$about 4.6 and 7.87 are due to the block bond of butadiene unit. This fact shows that in the butadiene/acrylonitrile copolymer obtained by the present invention, both the monomer units are bonded substantially alternately.

The composition ratio of both the monomer units in the copolymer can be calculated from an area ratio of resonance spectrum of each proton in NMR spectrum.

It was confirmed with the copolymer having a well-known composition ratio that this means is correct. For example, the composition ratio of the copolymer can be calculated from the ratio of the integral value of the spectrum of methine proton in butadiene unit to the integral value of the spectra of methine proton and methylene proton in acrylonitrile unit and methylene proton in butadiene unit. When the composition of the copolymer obtained by the present invention was analyzed by this means, it was found that even if the composition of fed monomers is varied, the composition of the resulting copolymers does not vary always and the mole ratio of both the monomer units is 1:1.

(d) Elementary analysis: As a method of copolymerizing butadiene with acrylonitrile, the use of a free radical initiator has been known. In this copolymerization reaction, the composition of the copolymer is determined by a probability limited by monomer feed ratio, the monomer reactivity ratios and the like.

Therefore, in the same combination of monomers, the composition of the copolymer generally is varied by changing the monomer feed ratio. Accordingly, the distinction of an alternating copolymer of the present invention and a random copolymer obtained by using a free radical initiator can be attained by observing the variation of the composition of the copolymer corresponding to the variation of the fed monomers or comparing the found value and the theoretical value of the composition of the copolymer in free radical copolymerization reaction.

The composition of the copolymer can be measured by an elementary analysis of the copolymer. By this method, it has been found that the composition of the copolymer obtained by the present invention has no relation to the theoretical value of the free radical copolymer and has substantially always a constant composition. Furthermore, it has been supported that the composition is substantially always 1:1 and the resulting copolymer has an alternating copolymerization configuration.

(e) Pyrolysis: A method of quantifying monomers generated by pyrolysis with gas chromatography.

The butadiene/acrylonitrile copolymer obtained by the present invention was subjected to a pyrolysis at 500° C. and the proportion of the generated butadiene monomer and acrylonitrile monomer was measured and compared with the value in a random copolymer. As the result, the former, i.e., the copolymer obtained by the present invention, contains about 28% of acrylonitrile monomer, while the latter, i.e. the free radical copolymer was about 60%. Thus, the generated acrylonitrile monomer in the copolymers of the present invention is very small as compared with that in the free radical copolymer. This fact supports that the copolymer of the present invention has an alternating configuration.

(f) Stress-strain curve: When the strain is small, the proportion of the stress variation is small, but when the strain is large, the proportion of the stress variation is large corresponding to the variation of the strain, so that a state of the rising of the curve is observed. From this, it can be seen that a rapid increase of strength is based on the orientation-crystallization by drawing. Such an orientation-crystallization has never been found in the known random copolymers. This phenomenon is a remarkable characteristic of the novel alternating copolymer provided by the inventions. In addition this phenomenon proves that the copolymer has an excellently regular and alternating configuration.

As mentioned above, the butadiene/acrylonitrile copolymers obtained by the present invention are the alternating copolymers different from random and graft copolymers obtained by a conventional emulsion polymerization process using a known free radical initiator and have remarkable characteristics which have never been observed in these conventional random and graft copolymers. For example, the properties in the butadiene/acrylonitrile copolymer will be explained in detail hereinafter.

(1) The alternating copolymer has a lower glass transition temperature in uncured state than the conventional random copolymer having the same butadiene unit content.

(2) Compounds were prepared according to the following recipe and then cured at 145° C. for 60 minutes.

| | Parts |
|---|---|
| Copolymer | 100 |
| Carbon black SRF | 45 |
| Zinc white | 5 |
| Stearic acid | 1 |
| Phenyl-$\beta$-naphthylamine | 1 |
| Accelerator NOBS sp. | 1 |
| Sulfur | 1.5 |

Next, physical properties of the conventional random copolymer and the alternating copolymer obtained by the present invention were measured in the cured state. The results are shown in the following Table.

|  | Alternating copolymer [1] | Random copolymer |
|---|---|---|
| (a) Original state: | | |
| Hardness (JIS) | 69 | 86 |
| 100% modulus (kg./cm.[2]) | 39 | 105 |
| Tensile strength (kg./cm.[2]) | 230 | 194 |
| Elongation (percent) | 404 | 210 |
| (b) Oil resistance: [2] | | |
| Swell (percent) | 112 | 112 |
| Tensile strength (kg./cm.[2]) | 144 | 97 |
| Elongation (percent) | 312 | 150 |

[1] Intrinsic viscosity in dimethylformamide at 30° C. is 1.75.
[2] Oil=JIS "B," room temperature×48 hours. "B"=isooctane/toluene (70/30).

As seen from this result, it can be seen that the alternating copolymer has remarkable characteristics which have never been possessed by the random copolymer. Namely, hardness and modulus are small and tensile strength and elongation are considerably large. Furthermore, tensile strength and elongation after swelling are extremely large, and the impact resilience of the alternating copolymer at 60° C. was 160% of the impact resilience of the random copolymer.

As described above it is apparent that the alternating copolymers of the present invention possess characteristics which cannot be considered from the random copolymer and have desirable excellent properties to be used as rubber.

There are many applications in which these characteristics can be utilized and many of them are developed by the properties of the alternating copolymer which have not been possessed by conventional random and graft copolymers.

The alternating copolymers may be used as such and further may be converted to a material having a three-dimensional configuration by means of a cross linking agent.

They have wide utilizations, for example, they can be used for various plastic materials, materials for rubbery composition, adhesive, fiber, film, compound, latex, paint, surface treating agent, etc.

The following examples are given in illustration of this invention and are not intended as limitations thereof.

EXAMPLE 1

A beverage bottle of 100 ml. capacity was deaired, dried and filled with purified nitrogen. Into the bottle were charged 1.36 g. (10 mmoles) of zinc chloride and dried under vacuum at 300° C. for 15 minutes to obtain anhydrous zinc chloride (hereinafter, thus heat-treated zinc chloride is called as anhydrous zinc chloride), which was cooled to room temperature. Then, 6.6 ml. (100 mmoles) of acrylonitrile were charged into the bottle and the resulting mixture was aged at 60° C. for 1 hour to prepare a zinc chloride/acrylonitrile complex. The thus obtained complex was cooled to −78° C., and added with 5.4 g. (100 mmoles) of butadiene and then 0.47 ml. (5 mmoles) of vanadyl trichloride, after which the bottle was closed tightly and a polymerization reaction was effected at 60° C. for 22 hours. Then a large amount of 5% solution of 2,6-di-tert-butyl-p-cresol in methanol was added to the copolymerization system to stop the reaction and to precipitate the resulting copolymer. The precipitate was dried under vacuum in a conventional manner to obtain an excellent elastic copolymer in a yield of 21.2%. The obtained copolymer was dissolved completely in dimethylformamide, chloroform, tetrahydrofuran, acetonitrile and nitrobenzene, and contained no gel. The intrinsic viscosity of the copolymer in dimethylformamide at 30° C. was 1.67.

The copolymer was dissolved in deuterochloroform, and NMR spectrum of the copolymer was measured at 60 megacycles.

As a control, NMR spectrum was measured with respect to a conventional random copolymer having a known acrylonitrile content under the same conditions. As the result, it was confirmed that the composition of the copolymer can be determined from the ratio of the area of NMR spectrum of the methine proton in butadiene unit to the area of NMR spectrum of the methine proton of acrylonitrile unit and the methylene proton of acrylonitrile unit and butadiene unit. In this way, the composition of the resulting copolymer was identified.

As the result, it was found that the content of acrylonitrile unit was 50.9 mol percent. That is, the resulting copolymer was composed of the same mole amount of butadiene unit and acrylonitrile unit and the composition was 1:1. Furthermore, it was found that the copolymer contained neither homopolymer nor block polymer by checking chemical shifts and had a good stereospecific property from the simplicity and the sharpness of NMR spectrum. The above-mentioned facts obtained by the NMR spectrum show that the copolymer is an alternating copolymer having a good stereo-specific property.

A film of the copolymer was formed on a rock salt plate and the IR spectrum of the copolymer was measured. The characteristic absorption band of nitrile group in the acrylonitrile unit and that of trans-1,4 bond in the butadiene unit were observed apparently at 2,240 cm.$^{-1}$ and 973 cm.$^{-1}$ respectively. The characteristic absorption band of 1,2-bond in the butadiene unit was neglegible and that of cis-1,4 bond was not substantially observed. The microstructure value measured by Morero's method was 98% of trans-1,4 bond, 2% of 1,2-bond and 0% of cis-1,4 bond.

As described above the obtained copolymer was a high molecular weight rubbery elastic copolymer containing substantially no part insoluble in dimethylformamide, methyl ethyl ketone, chloroform, etc., and was a stereospecific alternating copolymer, wherein substantially the whole butadiene unit was bonded in trans-1,4 type. According to the elementary analysis, found value of carbon was 76.88%, that of hydrogen 8.41%, and that of nitrogen 12.79%. The total value of the three elements was 98.08%. Accordingly, if the value is 100%, each value of carbon, hydrogen and nitrogen is calculated into 78.38%, 8.57% and 13.04%, respectively. In the theoretical values of alternating copolymer containing the same moles of butadiene and acrylonitrile, carbon is 78.45%, hydrogen 8.47%, and nitrogen 13.08%, so that the found values agree with the theoretical values well. Furthermore, the nitrogen content showed that the obtained copolymer contained 49.9 mol percent of acrylonitrile.

COMPARATIVE EXAMPLE 1

A copolymerization reaction was effected in the same manner as described in Example 1, except that 0.25 mmole of benzoyl peroxide (hereinafter abridged as BPO) of a radical initiator was used instead of vanadyl trichloride, to obtain a copolymer in a yield of 45.8%. The gel content of the copolymer was 90%. The "gel content" is shown by weight percent of insoluble part in methyl ethyl ketone. Elementary analysis showed that the resulting copolymer contained 80.40% of carbon, 8.50% of hydrogen and 11.10% of nitrogen. It was found from the nitrogen content that the copolymer contained 42.5 mol percent of acrylonitrile. Furthermore, it was found from NMR spectrum that the copolymer contained block bond in butadiene unit and the alternating property was irregular.

It can be seen from Example 1 and Comparative Example 1 that the catalyst system of the present invention is superior to the zinc chloride/radical initiator catalyst system in view of the fact that a copolymer having a high alternating property and containing no gel can be obtained.

COMPARATIVE EXAMPLE 2

A copolymerization reaction was effected in the same manner as described in Example 1, except that vanadyl trichloride was not used, to obtain a copolymer in a yield of 21.5%. The gel content was 80%.

It can be seen from Example 1 and Comparative Example 2 that the catalyst system of the present invention is superior to the zinc chloride monocomponent catalyst in view of the fact that gel is not formed.

EXAMPLE 2

A copolymerization reaction was effected at 0° C. for 24 hours in the same recipe and manner as described in Example 1. A rubbery elastic copolymer was obtained in a yield of 10.5%. The copolymer had an intrinsic viscosity of 1.75 measured at 30° C. in dimethylformamide and contained no gel.

It was confirmed from NMR spectrum, elementary analysis, IR spectrum, solubility and others that the copolymer was an alternating copolymer.

COMPARATIVE EXAMPLE 3

A copolymerization reaction was effected in the same recipe and manner as described in Example 2, except that vanadyl trichloride was not used, but copolymers were not obtained.

It can be seen from Example 2 and Comparative Example 3 that when vanadyl trichloride is not used as a catalytic component, polymerization reaction does not occur at 0° C. Thus, it can be seen that the catalyst system of the present invention has a fairly high polymerization activity even at low temperature.

EXAMPLE 3

A copolymerization reaction was effected in the same manner as described in Example 1, except that 0.25 mmole of BPO was charged following the addition of vanadyl trichloride, to obtain a copolymer in a yield of 30.0%. It was found from elementary analysis, IR spectrum, NMR spectrum, solubility and others that the resulting copolymer was an alternating copolymer having substantially the same chemical structure as that of the copolymer obtained in Example 1.

Comparison of this Example 3 with Example 1 shows that the catalyst system of the present invention can be activated by radical initiator.

EXAMPLE 4

A beverage bottle of 100 ml. capacity was dried completely and filled with purified nitrogen. Into the bottle where charged 1.36 g. (10 mmoles) of anhydrous zinc chloride, to which were added 0.94 ml. (10 mmoles) of vanadyl trichlorideand then 6.6 ml. (100 mmoles) of acrylonitrile at room temperature. The resulting mixture was cooled to −78° C. and added with 5.4 g. (100 mmoles) of butadiene, and the bottle was closed tightly. A copolymerization reaction was effected at 60° C. for 17 hours to obtain a rubbery elastic copolymer in a yield of 22.8%. The copolymer had an intrinsic viscosity of 1.2 and contained no gel. It was found from NMR spectrum, IR spectrum and elementary analysis that the copolymer was an alternating copolymer containing 97% of trans-1,4 bond.

EXAMPLE 5

A beverage bottle of 100 ml. capacity was dried completely and filled with purified nitrogen. In the bottle, a zinc chloride-acrylonitrile complex was prepared from 1.36 g. (10 mmoles) of anhydrous zinc chloride and 6.6 ml. (100 mmoles) of acrylonitrile. To the complex were added 5.4 g. (100 mmoles) of butadiene and then 0.94 ml. (10 mmoles) of vanadyl trichloride at −78° C., and the bottle was closed tightly. A copolymerization reaction was effected at 60° C. for 17 hours to obtain a copolymer containing no gel in a yield of 13.7%.

NMR spectrum, IR spectrum and elementary analysis value showed that the copolymer was an alternating copolymer containing more than 95% of trans-1,4 bond.

EXAMPLE 6

In the same manner as described in Example 4, a zinc chloride-acrylonitrile complex was prepared from 1.36 g. (10 mmoles) of anhydrous zinc chloride and 6.6 ml. (100 mmoles) of acrylonitrile. To the complex was added 0.47 ml. (5 mmoles) of vanadyl trichloride at room temperature. The resulting mixture was cooled to −73° C. and added with 5.4 g. (100 mmoles) of butadiene. A copolymerization reaction was effected at 60° C. for 17 hours to obtain a rubbery elastic copolymer in a yield of 14.5%.

The copolymer was an alternating copolymer having an intrinsic viscosity of 1.7 and containing no gel.

EXAMPLE 7

In the same manner as described in Example 4, a zinc chloride-acrylonitrile complex was prepared from 1.36 g. (10 mmoles) of anhydrous zinc chloride and 6.6 ml. (100 mmoles) of acrylonitrile. To the complex was added 0.94 ml. (10 mmoles) of vanadyl trichloride at room temperature, and the resulting mixture was aged at 60° C. for 17 hours. After completion of the aging, the assembly was cooled to −78° C., and 5.4 g. (100 mmoles) of butadiene were added thereto. A copolymerization reaction was effected at 60° C. for 72 hours to obtain a rubbery elastic copolymer in a yield of 14.2%.

The copolymer was an alternating copolymer having an intrinsic viscosity of 1.4 and containing no gel.

EXAMPLES 8–10

In the same manner as described in Example 4, a zinc chloride-acrylonitrile complex was prepared from 1.36 g. (10 mmoles) of anhydrous zinc chloride and 6.6 ml. (100 mmoles) of acrylonitrile. To the complex were added 5 mmoles of a catalytic component (A) as shown in the following Table 1 at room temperature, and further added 5.4 g. (100 mmoles) of butadiene at −78° C. A copolymerization reaction was effected at 60° C. for 24 hours to obtain a rubbery elastic copolymer.

The yield and the intrinsic viscosity of the copolymer are shown in the following Table 1.

TABLE 1

| Example number | Catalytic component (A) | Yield (percent) | Intrinsic viscosity (dl./g.) |
| --- | --- | --- | --- |
| 8 | Penta-ethoxy tantalum | 7.5 | 1.5 |
| 9 | Tetra-isopropoxy titanium | 31.0 | 1.7 |
| 10 | Zirconium oxydichloride | 22.1 | 1.8 |

Furthermore, it was found from NMR spectrum, IR spectrum and elementary analysis values that the copolymer was a stereospecific alternating copolymer, wherein substantially the whole butadiene units are bonded in trans-1,4 type, and was a rubbery elastomer containing substantially no gel.

EXAMPLE 11

A beverage bottle of 100 ml. capacity was completely dried, and air in the bottle was replaced with nitrogen. Into the bottle were charged 10 mmoles of anhydrous aluminum trichloride purified by sublimation and 100 mmoles of acrylonitrile purified by distillation. After the bottle was closed, the aluminum trichloride and the acrylonitrile were reacted at 60° C. for 5 hours to form an aluminum-acrylonitrile complex. The reaction system was a homogeneous liquid. Then, the bottle was cooled to −78° C., added with 100 mmoles of butadiene and 1.0 mmoles of vanadyl trichloride, and then closed. A copolymerization reaction was effected at 60° C. for 24 hours.

A small amount of methanol was added to the copolymerization system to stop the reaction, and the resulting copolymer was precipitated by adding methanol containing 1% of 2,6-di-tert-butyl-p-cresol as an antioxidant. The copolymer was washed several times with the above-mentioned methanol containing the antioxidant, and dried under vacuum to obtain a rubbery elastic copolymer in a yield of 6.7% based on the total amount of monomers. The intrinsic viscosity of the copolymer measured in dimethylformamide at 30° C. was 1.5.

The copolymer was dissolved in deuterochloroform and NMR spectrum of the copolymer was measured at 60 megacycles.

As the result, it was found that the content of acrylonitrile unit was 49.1 mol percent. That is, the resulting copolymer was composed of the same mole amount of butadiene units and acrylonitrile units and the composition was 1:1.

Furthermore, it was found that the copolymer contained neither homopolymer nor block bond by checking chemical shifts and had a good stereospecific property from the simplicity and the sharpness of the NMR spectrum. The above-mentioned facts obtained by the NMR spectrum show that the copolymer is an alternating copolymer having a good stereospecific property.

The copolymer was dissolved in chloroform, and a film of the copolymer was formed on a rock salt plate, and an IR spectrum of the copolymer was measured. The characteristic absorption band of nitrile group in the acrylonitrile unit and that of trans-1,4 bond in the butadiene unit were observed apparently at 2,240 cm.$^{-1}$ and 973 cm.$^{-1}$, respectively. The characteristic absorption band of 1,2-bond in the butadiene unit was negligible and that of cis-1,4 bond was not observed at all. The microstructure value measured by Morero's method was 97.3% of trans-1,4 bond, 2.7% of 1,2-bond and 0% of cis-1,4 bond.

As described above, it was found that the obtained copolymer was a stereospecific alternating copolymer, wherein substantially the whole butadiene units were bonded in trans-1,4 type. Elementary analysis showed that the copolymer contained 79.03% of carbon, 8.99% of hydrogen and 12.93% of nitrogen. While, in the theoretical values of the alternating copolymer composed of butadiene and acrylonitrile in a molar ratio of 1:1, carbon is 78.47%, hydrogen 8.46% and nitrogen 13.07%. Therefore, the found values agree with the theoretical values very well.

COMPARATIVE EXAMPLE 4

Butadiene and acrylonitrile were copolymerized under the same condition as described in Example 11, except that vanadyl trichloride was not used. The polymerization product was treated and dried in the same manner as described in Example 11 to obtain a copolymer in a yield of 3.2%.

Elementary analysis of the obtained copolymer showed that it contained 81.60% of carbon, 9.32% of hydogen, and 9.08% of nitrogen, and these values are considerably deviated from the theoretical values of 1:1 copolymer.

Furthermore, it was found from NMR spectrum that the obtained copolymer apparently contained chains of butadiene units, and was a random copolymer.

Comparison of this Comparative Example 4 with Example 11 shows that the catalyst system of the present invention provides alternating copolymers having an excellent alternating property.

EXAMPLE 12

The treatment in this example was effected in the same manner as described in Example 11, except that (tri-tert-butoxy) vanadyl, VO(O-tert-Bu)$_3$, was used instead of vanadyl trichloride, to obtain a rubbery elastic copolymer in a yield of 2.3% based on the total amount of monomers.

It was confirmed from elementary analysis values (C:79.00%; H:8.84% and N:12.16%), IR spectrum and NMR spectrum that the obtained copolymer was an alternating copolymer.

EXAMPLE 13

The treatment in this example was effected in the same manner as described in Example 11, except that 5 mmoles of vanadyl trichloride were used (Al/V=2/1 (molar ratio)), to obtain a rubbery elastic copolymer in a yield of 2.7%.

It was found from elementary analysis values (C:80.37%, H:7.72% and N:11.91%), IR spectrum and NMR spectrum that the obtained copolymer was an alternating copolymer.

EXAMPLE 14

The treatment in this example was effected in the same manner as described in Example 11, except that aluminumtrichloride ethyl etherate, AlCl$_3$·(C$_2$H$_5$)$_2$O, was used instead of anhydrous aluminum trichloride, to obtain a rubbery elastic copolymer in a yield of 1.5%.

It was confirmed from elementary analysis, IR spectrum and NMR spectrum that the obtained copolymer was an alternating copolymer.

EXAMPLE 15

Into a butadiene-acrylonitrile copolymerization system prepared in the same manner as described in Example 11 was added 1.0 mmole of 2,2'-azo-bis-isobutyronitrile, and the beverage bottle was sealed. A copolymerization reaction was effected at 60° C. for 20 minutes and then the reaction was stopped immediately. The polymerization product was treated and dried in the same manner as described in Example 11 to obtain a rubbery elastic copolymer in a yield of 19.1%.

It was confirmed from elementary analysis, IR spectrum and NMR spectrum that the obtained copolymer was an alternating copolymer.

This Example 15 shows that the polymerization activity of the catalyst is remarkably increased by the addition of radical initiators.

EXAMPLE 16

In this example, anhydrous aluminum tribromide was used instead of anhydrous aluminum trichloride used in Example 15.

Into a beverage bottle of 100 ml. capacity were charged 129 mmoles of acrylonitrile, 2.58 mmoles of aluminum tribromide, 0.052 mmole of vanadyl trichloride, 64.5 mmoles of butadiene, 1.29 mmoles of triethylboron and 0.13 mmole of oxygen. After the bottle was closed, a copolymerization reaction was effected at 0° C. for 48 hours.

As the resulting polymer contained soluble part in methanol, unrecated monomers were distilled off under reduced pressure. The residue was dissolved in methyl ethyl ketone, and purified by means of a centrifugal separator to obtain a rubbery elastic copolymer in a yield of 29.5%. It was confirmed from elementary analysis, IR spectrum and NMR spectrum that the copolymer was an alternating copolymer.

EXAMPLES 17 AND 18

The treatments in these examples were effected in the same manner as described in Example 11, except that zirconium tetrachloride was used instead of vanadyl trichloride, to obtain butadiene-acrylonitrile copolymers. The obtained result is shown in the following Table 2.

TABLE 2

| Experimental number | ZrCl$_4$ (mmole) | AlCl$_3$/ZrCl$_4$ (molar ratio) | Yield (percent) |
|---|---|---|---|
| 17 | 5.0 | 2/1 | 6.2 |
| 18 | 1.0 | 10/1 | 5.8 |

It was confirmed from elementary analysis, IR spectrum and NMR spectrum that both the obtained copolymers are alternating copolymers.

EXAMPLES 19-24

A complex of aluminum hydride dichloride with diethylether was prepared according to the method disclosed by Dr. Herman, Winter and Marl in German Pat. No. 1,210,778. This complex was used in a diethylether solution.

A copolymerization reaction was effected in the following procedure.

A beverage bottle of 100 ml. capacity was dried completely and filled with purified gaseous nitrogen. Into the bottle were charged 6.6 ml. of acrylonitrile and 7 mmoles of aluminum hydride dichloride at room temperature. The bottle was cooled to −78° C., and further charged with 7.6 ml. of liquid butadiene and a catalytic component (A) as shown in the following Table 3. The bottle, after closing, was left to stand at 0° C. for 30 hours to effect a copolymerization reaction. Then, the content in the vessel was poured into a large amount of methanol containing a small amount of phenyl-β-naphthylamine to stop the copolymerization reaction, and the resulting copolymer was precipitated. The copolymer was purified and dried in a conventional manner to obtain a rubbery elastic copolymer.

The result is shown in the following Table 3.

TABLE 3

| Ex. No. | Catalytic component (A) | | Yield (percent) | Intrinsic viscosity (dl./g.) |
|---|---|---|---|---|
| | Kind | Amount (mmole) | | |
| 19 | Vanadyl trichloride | 0.70 | 28 | 1.67 |
| 20 | do | 0.35 | 43 | 1.80 |
| 21 | (Tri-tert-butoxy)vanadyl | 0.35 | 42 | 1.97 |
| 22 | Penta-ethoxy tantalum | 0.35 | 16 | 1.66 |
| 23 | Tetra-propoxy titanium | 0.35 | 23 | 2.30 |
| 24 | Tetra-propoxy zirconium | 0.35 | 56 | 2.16 |

It was confirmed from IR spectrum, NMR spectrum and elementary analysis that the copolymers obtained in this example also were alternating copolymers, in which butadiene unit contains more than 95% of trans-1,4 bond and butadiene unit and acrylonitrile unit are bonded substantially alternately.

EXAMPLES 25-28

In a 100 ml. pressure bottle were charged an acrylonitrile-aluminum trichloride complex ($AlCl_3$ 4.0 mmoles/ acrylonitrile 200 mmoles) which was prepared in the similar manner as described in Example 11, 100 mmoles of butadiene, 0.4 mmoles of vanadyl trichloride, and 2.0 mmoles of a radical initiator which was shown in the following Table 4 at −78° C. under nitrogen atmosphere.

Then, the bottles were kept at 25° C. for 3 hours to obtain results as shown in the following Table 4.

TABLE 4

| Example number | Radical initiator | Copolymer | |
|---|---|---|---|
| | | Grams | Acrylonitrile content (mol percent) |
| 25 | None | 0.24 | 48.4 |
| 26 | Azobisisobutylonitrile | 0.33 | 49.2 |
| 27 | Diisopropyl peroxydicarbonate | 1.10 | 49.2 |
| 28 | Benzoyl peroxide | 1.90 | 48.6 |

The obtained copolymers were all rubbery solids. The copolymers were dissolved in deuterochloroform and each of the solutions was measured with respect to NMR spectrum at 100 megacycles.

Figure 6:
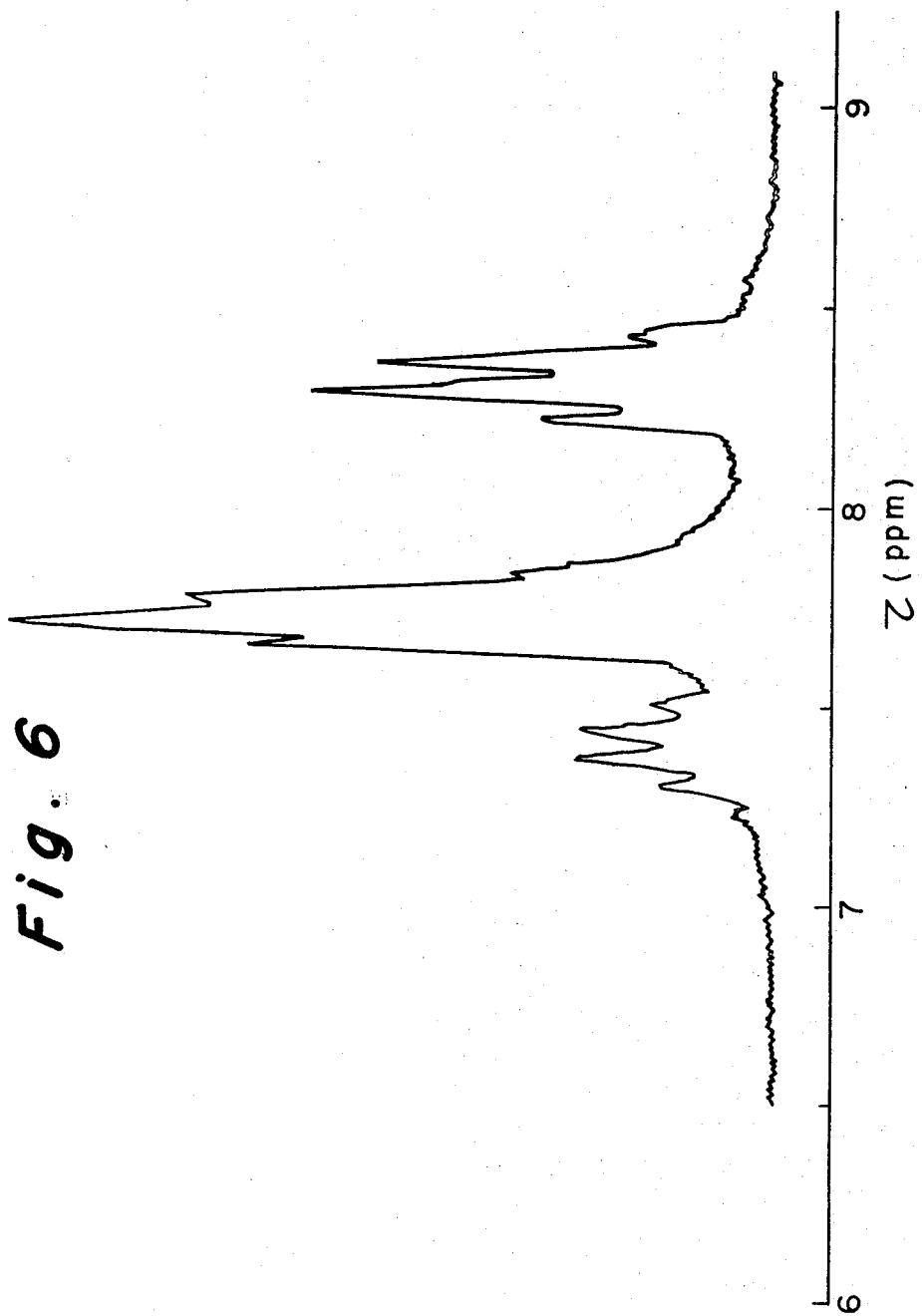
FIG. 6 is a nuclear magnetic resonance spectrum diagram of butadiene/acrylonitrile copolymer in the following Example 25.
Figure 7:
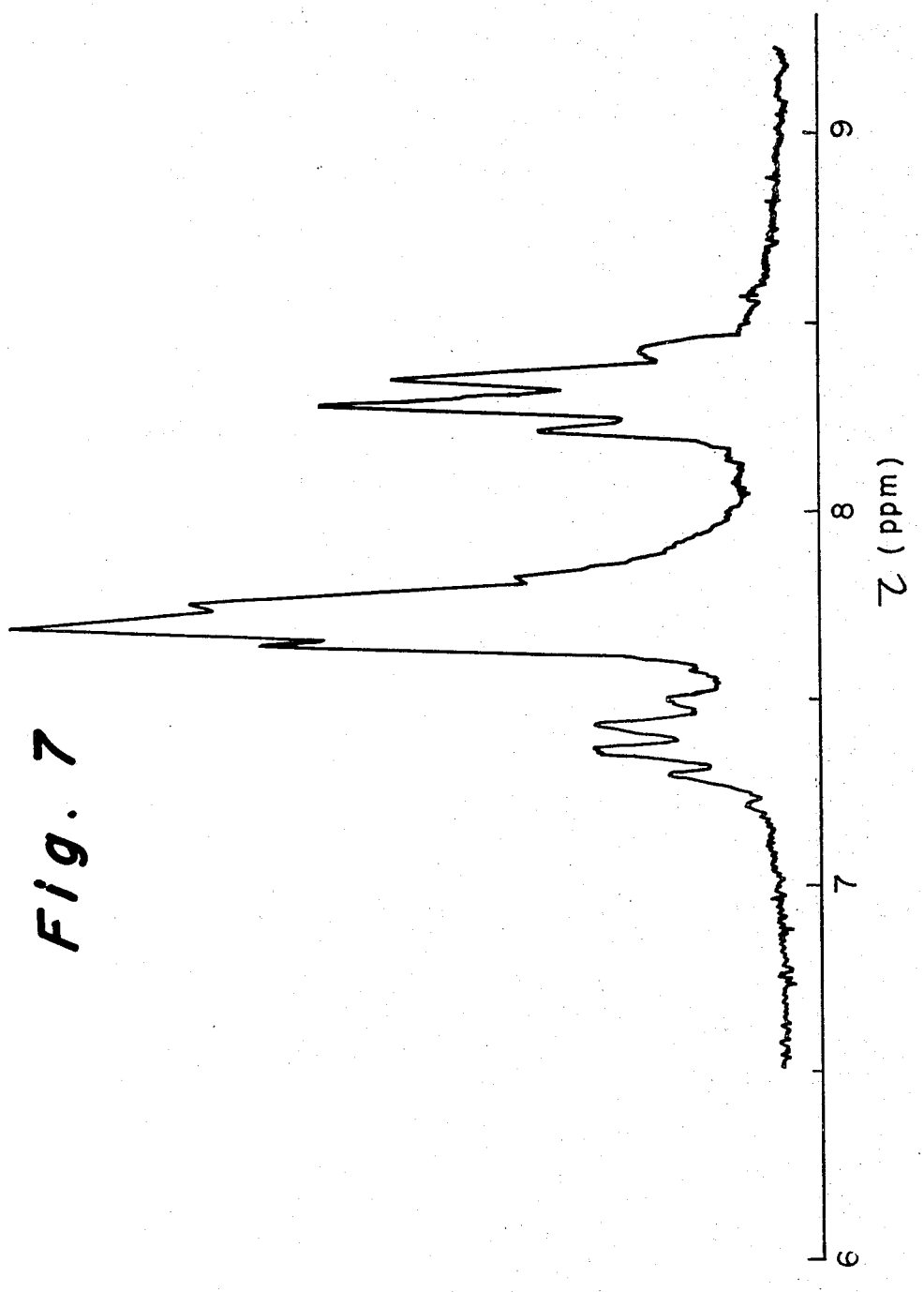
FIG. 7 is a nuclear magnetic resonance spectrum diagram of butadiene/acrylonitrile copolymer in the following Example 27.

The spectra in the region from 7.0τ (p.p.m.) to 9.0τ (p.p.m.) of the copolymers obtained in Examples 25 and 27 were shown in FIG. 6 and FIG. 7, respectively. These spectra show that the copolymer obtained in the above examples are all alternating copolymers.

EXAMPLES 29-33

Butadiene and acrylonitrile were copolymerized according to the same manner as described in Examples 25 to 28 except using 2.0 mmoles of benzoyl peroxide as a radical initiator and various kinds of molecular weight regulators shown in the following Table 5. The obtained results are shown in Table 5.

TABLE 5

| Example number | Regulator | Mmole | Copolymer | |
|---|---|---|---|---|
| | | | (G.) | Intrinsic viscosity (dl./g.) |
| 29 | None | | 1.84 | 0.98 |
| 30 | $CBr_4$ | 0.4 | 1.14 | 0.46 |
| 31 | $CHI_3$ | 0.4 | 1.24 | 0.33 |
| 32 | $n\text{-}C_{12}H_{25}SH$ | 2.0 | 1.21 | 0.69 |
| 33 | $n\text{-}C_{12}H_{25}SH$ | 4.0 | 1.00 | 0.43 |

The obtained copolymers were all rubbery solids, and the values of intrinsic viscosity clearly show that the use of molecular weight regulator is effective for depressing the molecular weight of the resulting copolymer.

EXAMPLE 34

In a 100 ml. pressure bottle were charged 100 mmoles of isoprene, 100 mmoles of acrylonitrile, 4.0 mmoles of aluminum trichloride, 0.4 mmole of vanadyl trichloride and 2.0 mmoles of benzoyl peroxide at −78° C. under nitrogen atmosphere.

A copolymerization was carried out at 25° C. for 7.0 hours to obtain a rubbery solid copolymer and the yield was 1.35 g. According to the elementary analysis, the copolymer contained 50.1 mol percent of acrylonitrile unit. When benzoyl peroxide was not used in the above procedure, the yield of the product was 0.18 g.

EXAMPLE 35

Butadiene and methyl methacrylate were copolymerized in the similar manner as described in Example 34 using 100 mmoles of butadiene, 100 mmoles of methyl methacrylate, 20 mmoles of aluminum trichloride, 0.4 mmole of vanadyl trichloride and 2.0 mmoles of benzoyl peroxide at 25° C. for 30 hours to obtain 2.0 g. of a rubbery copolymer. According to the elementary analysis, the copolymer contained 49.0 mol percent of methyl methacrylate unit.

When benzoyl peroxide was not used in the above procedure, the yield was 0.2 g.

EXAMPLE 36

Butadiene, acrylonitrile and n-butyl acrylate were copolymerized in the similar manner as described in Example 34 using 100 mmoles of butadiene, 80 mmoles of acrylonitrile, 20 mmoles of n-butyl acrylate, 4.0 mmoles of aluminum trichloride, 0.44 mmole of vanadyl trichloride and 2.0 mmoles of benzoyl peroxide at 25° C. for 7 hours to obtain 1.08 g. of a rubbery solid copolymer. According to the elementary analysis, the copolymer contained 48.5 mol percent of butadiene unit, 47.0 mol percent of acrylonitrile unit and 4.5 mol percent of n-butyl acrylate unit. When benzoyl peroxide was not used in the above procedure, the yield was 0.17 g.

EXAMPLES 37-39

Butadiene and acrylonitrile were copolymerized at various monomer compositions (total 500 mmoles) using 10 mmoles of a zinc chloride-acrylonitrile complex, 5.0 mmoles of vanadyl trichloride and 0.5 mmole of a radical initiator at 40° C. All of the polymerizations were stopped at low conversion. The obtained results are shown in the following Table 6.

TABLE 6

| Example number | Catalyst systems | (Monomer) AN/BD (molar ratio) | (Polymer) AN (mol percent) |
|---|---|---|---|
| 37 | ZnCl₂—VOCl₃ | 8/2 | 49.8 |
|  | ZnCl₂—VOCl₃ | 5/5 | 49.4 |
|  | ZnCl₂—VOCl₃ | 3/7 | 50.0 |
| 38 | ZnCl₂—VOCl₃—tBPP | 8/2 | 52.5 |
|  | ZnCl₂—VOCl₃—tBPP | 5/5 | 50.5 |
|  | ZnCl₂—VOCl₃—tBPP | 3/7 | 50.6 |
| 39 | ZnCl₂—VOCl₃—BPO | 8/2 | 52.2 |
|  | ZnCl₂—VOCl₃—BPO | 5/5 | 50.0 |
|  | ZnCl₂—VOCl₃—BPO | 3/7 | 51.1 |

NOTE.—AN=Acrylonitrile, BD=Butadiene, tBPP=t-Butyl peroxypivalate, BPO=Benzoyl peroxide.

The data show that even when monomer compositions are varied, copolymers wherein both monomer units are bonded substantially alternately can be obtained.

EXAMPLES 40–43

Copolymerizations were carried out at acrylonitrile/butadiene 1/1 molar ratio under the same condition as described in Example 37 except using various kinds of molecular weight regulators. The obtained results are shown in the following Table 7.

TABLE 7

| Example number | Regulator | Mmole | Yield (g.) | Intrinsic viscosity (dl./g.) |
|---|---|---|---|---|
| 40 | None |  | 0.11 | 1.30 |
| 41 | n-C₁₂H₂₅SH | 0.4 | 0.20 | 1.18 |
| 42 | CHI₃ | 0.4 | 0.21 | 0.59 |
| 43 | CBr₄ | 0.4 | 0.12 | 0.99 |

EXAMPLES 44–46

Butadiene and methyl methacrylate, isoprene and acrylonitrile, and butadiene, acrylonitrile and n-butyl acrylate were copolymerized respectively using 10 mmoles of zinc chloride, 5.0 mmoles of vanadyl trichloride at 40° C. for 40 hours.

The obtained results are shown in the following Table 8.

TABLE 8

| Example number | Monomers | Molar ratio (mmole) | Yield (g.) | Polymers Composition | Mol percent |
|---|---|---|---|---|---|
| 44 | BD/MMA | 250/250 | 0.1 | MMA | 47.6 |
| 45 | IP/AN | 250/250 | 2.3 | AN | 48.0 |
| 46 | BD/AN/BA | 250/200/50 | 1.62 | BD / AN / BA | 46.5 / 48.2 / 5.3 |

NOTE.—BD=Butadiene, IP=Isoprene, MMA=Methyl methacrylate, AN=Acrylonitrile, BA=n-Butyl acrylate.

What is claimed is:

1. A method of preparing alternating copolymers of conjugated dienes with conjugated polar ethylenically unsaturated monomers, wherein the conjugated diene unit and the conjugated polar ethylenically unsaturated monomer unit are bonded alternately, which comprises copolymerizing at least one monomer selected from conjugated dienes having 4 to 10 carbon atoms with
at least one conjugated polar ethylenically unsaturated monomer selected from the group consisting of acrylonitrile, methacrylonitrile, methyl acrylate, ethyl acrylate, propyl acrylate, butyl acrylate, methyl methacrylate and ethyl methacrylate
at a temperature of −30° C. to +80° C.
in a non-aqueous liquid medium
in the presence of a catalyst prepared from a component (A): at least one transition metal compound selected from compounds of transition metals of the Groups IV–B and V–B in the Periodic Table, provided that the chelate compounds are excepted, and a component (B): at least one metal halide selected from the group consisting of zinc halides having the general formula $ZnX_2$ and aluminum compounds having the general formulae $$AlH_nX_{3-n} \text{ and } AlH_nX_{3-n} \cdot L$$

in the above formulae X represents a halogen atom selected from the group consisting of fluorine, chlorine, bromine and iodine atoms, L represents ether having up to 20 carbon atoms and $n$ is a number selected from the group consisting of 0, 0.5, 1.0 and 2.0, the transition metal atom in the component (A) being $1/10^6$ to 2 g.-atom based on 1 g.-atom of the metal atom in the component (B), the total amount of the metal atoms in the catalyst system being $1/10^5$ to 1 g.-atom based on 1 mole of fed monomers and the molar ratio of the total amount of the conjugated dienes to the total amount of the conjugated polar ethylenically unsaturated monomers being 1/10 to 10/1.

2. The methods as claimed in claim 1, wherein the monomers are copolymerized in the presence of the catalyst system and
in the additional presence of at least one molecular weight regulator selected from the group consisting of mercaptans, carbon tetrabromide, trichloromonobromomethane, bromoform, iodoform, and carbon tetraiodide, the molar ratio of the total amount of the molecular weight regulator to the fed monomers being from $10^{-8}:1$ to $0.05:1$.

3. The method as claimed in claim 1, wherein said conjugated diene is butadiene.

4. The method as claimed in claim 1, wherein said conjugated polar ethylenically unsaturated monomer is acrylonitrile.

5. The method as claimed in claim 1, wherein said component (A) is a vanadium compound.

6. The method as claimed in claim 5, wherein said vanadium compound is vanadyl trichloride.

7. The method as claimed in claim 5, wherein said vanadium compound is tri-tert-butyl orthovanadate.

8. The method as claimed in claim 1, wherein said component (A) is selected from the group consisting of zirconium oxydichloride, tetrapropoxy zirconium, zirconium tetrachloride, tetra-propoxy titanium, tetraisopropoxy titanium and pentaethoxy tantalum.

9. The method as claimed in claim 1, wherein said component (B) is aluminum hydride dichloridediethylether complex.

10. The method as claimed in claim 1, wherein said component (B) is aluminum trichloride.

11. The method as claimed in claim 1, wherein said component (B) is aluminum tribromide.

12. The method as claimed in claim 1, wherein said component (B) is zinc chloride.

13. The method as claimed in claim 1, wherein butadiene and methylmethacrylate are copolymerized.

14. The method as claimed in claim 1, wherein isoprene and acrylonitrile are copolymerized.

15. The method as claimed in claim 1, wherein butadiene, acrylonitrile and n-butyl acrylate are terpolymerized.

16. The method as claimed in claim 21, wherein said azonitrile compound is azobisisobutyronitrile.

17. The method as claimed in claim 21, wherein said trialkylboron is triethylboron.

18. The method as claimed in claim 3, wherein said mercaptan is 1-dodecanethiol.

19. The method as claimed in claim 1, wherein said catalyst system is aluminum chloride-vanadyl trichloride.

20. The method as claimed in claim 1, wherein said catalyst system is zinc chloride-vanadyl trichloride.

21. The method as claimed in claim 1 wherein the monomers are copolymerized in the presence of components (A) and (B) and
in the additional presence of at least one radical initiator as catalyst component (C), which is selected from the group consisting of azonitrile compounds and trialkylboron-oxygen systems, the molar ratio of the total amount of component (C) to the fed monomers being from 0.00005:1 to 0.05:1.

References Cited
UNITED STATES PATENTS

| | | | |
|---|---|---|---|
| 2,940,048 | 7/1960 | Nowlin et al. | 260—94.9 |
| 3,024,227 | 5/1962 | Nowlin et al. | 260—94.9 |
| 3,099,648 | 7/1963 | Dye | 260—94.3 |
| 3,169,947 | 2/1965 | Stroh et al. | 260—85.5 |
| 3,352,839 | 11/1967 | Lehr | 260—94.3 |
| 3,386,983 | 6/1968 | Witte et al. | 260—94.3 |
| 3,413,274 | 11/1968 | Watanabe et al. | 260—87.3 |
| 3,418,304 | 12/1968 | Langer et al. | 260—93.7 |

JOSEPH L. SCHOFER, Primary Examiner

W. F. HAMROCK, Assistant Examiner

U.S. Cl. X.R.

260—82.5, 83.5